P. GIEBLER.
SHIFTING ECCENTRIC.
APPLICATION FILED MAY 11, 1908.
912,836.
Patented Feb. 16, 1909.
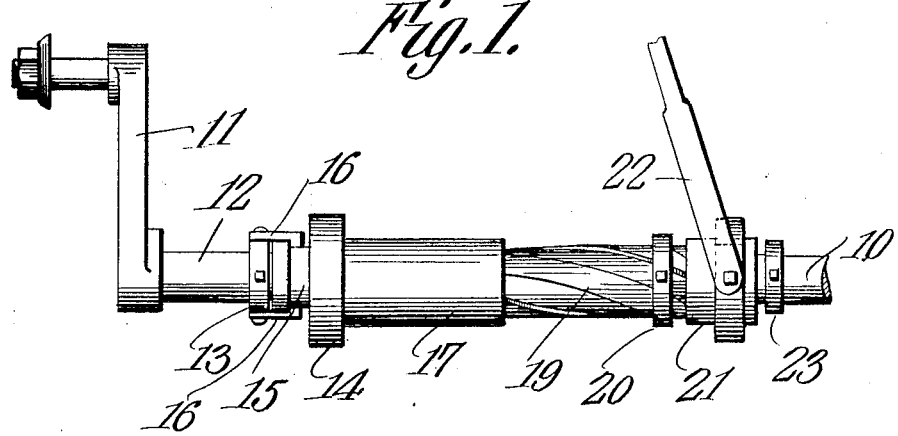
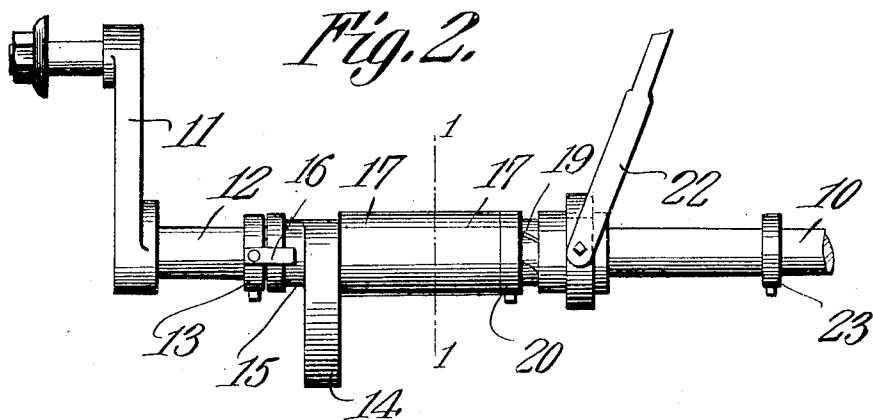
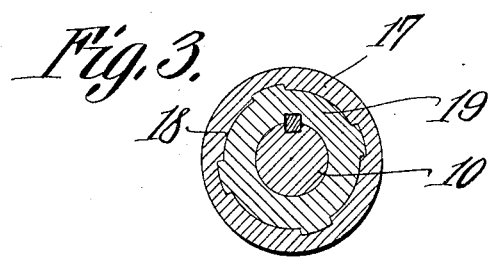
Witnesses
Inventor
Peter Giebler,
By C. A. Snow & Co.
Attorneys

UNITED STATES PATENT OFFICE.

PETER GIEBLER, OF CATHARINE, KANSAS.

SHIFTING ECCENTRIC.

No. 912,836.     Specification of Letters Patent.     Patented Feb. 16, 1909.

Application filed May 11, 1908. Serial No. 432,117.

*To all whom it may concern:*

Be it known that I, PETER GIEBLER, a citizen of the United States, residing at Catharine, in the county of Ellis and State of Kansas, have invented a new and useful Shifting Eccentric for Steam-Engines, of which the following is a specification.

This invention relates to steam engines and it has a special reference to eccentrics therefor, of the shifting type.

One object of the invention is to simplify the general construction of eccentrics of this character.

Another object of the invention is to so arrange an eccentric of this class that the action of the engine will tend to maintain the same in a constant position, thus relieving the shipper mechanism from undue stress.

The invention consists of an eccentric mounted on a shaft and arranged to rotate relative thereto, in combination with means to rotate the eccentric relative to the shaft and a stop for limiting the movement of the rotating means.

The invention further consists in certain novel arrangements of details and combinations of parts, hereinafter fully described, illustrated in the accompanying drawings, and specifically set forth in the claim.

In the accompanying drawings, like characters of reference indicate like parts in the several views, and; Figure 1 is a side elevation showing one position of the eccentric, Fig. 2 is a side elevation showing the eccentric in another position, Fig. 3 is a cross section on the line 1—1 of Fig. 2.

In the form of the invention here shown, the numeral 10 indicates the crank shaft of an engine and a crank 11 is provided thereon to rotate the same in the usual manner. This crank shaft is supported in suitable bearings not deemed necessary here to be shown, these bearings receiving the journals 12 of the shaft. Upon the shaft is held a collar 13. Adjacent the collar 13 is an eccentric 14 which in actual construction is provided with suitable eccentric straps not deemed necessary here to be shown. The eccentric 14 is free to revolve about the shaft 10, but is held from movement along the shaft by the coaction of a reduced and collared portion 15 and fingers 16 held upon the collar 13. Rigidly attached to the eccentric 14 is a sleeve 17. This sleeve 17 is spaced from the shaft 10 and is provided with internal screw threads 18 as best seen in Fig. 3. A second sleeve 19 is splined upon the shaft 10 for longitudinal movement thereon. This second sleeve is provided with external screw threads which engage the internal threads 18 of the sleeve 17. The sleeve 19 is further made of such size that it will neatly fit the space between the sleeve 17 and the shaft 10. Mounted upon the sleeve 19 is a collar 20, the same being capable of adjustment along said sleeve. This collar 20 acts in connection with the end of the sleeve 17 as a stop for limiting the inward movement of the sleeve 19 relative to the sleeve 17. The sleeve 19 is further provided with a grooved portion 21 and a shipper ring and shipper 22 are attached to said sleeve at this portion, the shipper being supported in the usual manner to slide said sleeve 19 along the shaft 10. A collar 23 is mounted on the shaft 10, being adjustable along said shaft, and forms a stop for limiting the outward movement of the sleeve 19.

It is to be particularly noted that the screw and collar are so arranged with reference to the position of the eccentric, that the revolution of the engine will tend to maintain the parts in constant fixed relation. That is to say, when the engine is running in one direction the sleeve 19 will be forced against the collar 23 and constantly held in that position by the action of the engine, and when the engine is running in the opposite direction the collar 20 will be held constantly against the sleeve 17. It will thus be seen that no undue stress is brought upon the shipper bar and shipper ring, in fact, there will be no stress upon the shipper except during the period of reversal of the engine. It is thus unnecessary to provide any locking means for the shipper as the same will stay in adjusted position without the aid of any such means.

It is obvious that many minor changes may be made in the form and proportion of this invention and it is not therefore desired to confine the same to the exact form herein shown and described, but it is wished to include all such as properly come within the scope of the invention.

Having thus described the invention what is claimed, is:—

In a reversing gear for engines, a shaft, an eccentric rotatably mounted upon said shaft, a grooved collar fixedly attached to said eccentric and closely embracing the shaft, a sleeve having internal screw threads fixedly attached to said eccentric upon the side opposite the collar in spaced relation to the shaft, a collar adjustably fixed on said shaft, a plurality of fingers rigidly attached to the adjustably fixed collar having inwardly bent ends held in the grooves of the grooved collar, a second sleeve slidably mounted on the shaft provided with external screw threads to co-act with the internal threads of the first mentioned sleeve, a second grooved collar fixedly carried by the second sleeve, a shipper ring held in the groove of the last mentioned collar, a shipper lever, a second collar mounted on the shaft provided with a set screw to hold the same in desired position on the shaft, and a third collar mounted on the sleeve provided with a set screw to hold the same in the desired position on the sleeve.

In testimony that I claim the foregoing as my own, I have hereto affixed my signature in the presence of two witnesses.

PETER GIEBLER.

Witnesses:
  A. E. BISSING,
  HERBERT BAKER.